(12) United States Patent
Bostick et al.

(10) Patent No.: US 10,165,231 B2
(45) Date of Patent: Dec. 25, 2018

(54) VISUALIZATION OF NAVIGATION INFORMATION FOR CONNECTED AUTONOMOUS VEHICLES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/196,576

(22) Filed: Jun. 29, 2016

(65) Prior Publication Data

US 2018/0005527 A1   Jan. 4, 2018

(51) Int. Cl.
| | |
|---|---|
| *H04N 7/18* | (2006.01) |
| *G08G 1/09* | (2006.01) |
| *G05D 1/00* | (2006.01) |
| *G01C 21/36* | (2006.01) |
| *G08G 1/0967* | (2006.01) |
| *G08G 1/01* | (2006.01) |

(Continued)

(52) U.S. Cl.
CPC ......... *H04N 7/185* (2013.01); *G01C 21/3647* (2013.01); *G05D 1/0088* (2013.01); *G08G 1/0112* (2013.01); *G08G 1/0141* (2013.01); *G08G 1/052* (2013.01); *G08G 1/056* (2013.01); *G08G 1/09675* (2013.01); *G08G 1/096716* (2013.01); *G08G 1/096725* (2013.01); *G08G 1/096741* (2013.01); *G08G 1/096775* (2013.01); *G01C 21/3691* (2013.01); *H04N 7/18* (2013.01)

(58) Field of Classification Search
CPC ........... G08G 1/0969; G08G 1/096725; G08G 1/096741; G08G 1/096775; G08G 1/096827; G08G 1/096844; G08G 1/137; G05D 1/0088; G06T 11/60; H04N 7/185; E02F 9/267; E02F 3/308; E02F 3/32; G07C 5/0816; G07C 5/0841; G07C 5/0833; G07C 5/0808; G07C 5/008; G07C 5/0825; G01L 1/16
USPC ........................................................ 701/23
See application file for complete search history.

(56) References Cited

U.S. PATENT DOCUMENTS

| | | |
|---|---|---|
| 8,050,863 B2 | 11/2011 | Trepagnier et al. |
| 8,280,623 B2 | 10/2012 | Trepagnier et al. |

(Continued)

FOREIGN PATENT DOCUMENTS

WO    2015/075799 A1    5/2015

*Primary Examiner* — Rodney A Butler
(74) *Attorney, Agent, or Firm* — Jay Wahlquist; Hunter E. Webb; Keohane & D'Alessandro PLLC (57) ABSTRACT

Embodiments described herein provide approaches for visualizing navigation information for a connected autonomous vehicle. Specifically, navigation communications (e.g., communications that are used in the decision making process of autonomous vehicles) from a plurality of vehicles within a particular area are received by a server. The server analyzes all of the navigation communications to determine which of the navigation communications is relevant to a particular connected autonomous vehicle. These relevant navigation communications are used by the server to generate contextual information about the other vehicles in the area. This contextual information is applied to a video display of the area.

20 Claims, 6 Drawing Sheets

(51) Int. Cl.
*G08G 1/052* (2006.01)
*G08G 1/056* (2006.01)

(56) References Cited

U.S. PATENT DOCUMENTS

| | | | |
|---|---|---|---|
| 8,352,111 B2* | 1/2013 | Mudalige | G08G 1/163 |
| | | | 340/435 |
| 8,954,226 B1 | 2/2015 | Binion et al. | |
| 9,008,904 B2 | 4/2015 | Szczerba et al. | |
| 9,182,764 B1* | 11/2015 | Kolhouse | G08G 1/017 |
| 9,384,666 B1* | 7/2016 | Harvey | G05D 1/0088 |
| 2010/0256852 A1* | 10/2010 | Mudalige | G08G 1/163 |
| | | | 701/24 |
| 2013/0138714 A1 | 5/2013 | Ricci | |
| 2013/0179056 A1 | 7/2013 | Fukuyama | |
| 2014/0236472 A1* | 8/2014 | Rosario | G01C 21/3602 |
| | | | 701/400 |
| 2015/0160019 A1* | 6/2015 | Biswal | G01C 21/26 |
| | | | 701/1 |
| 2015/0319510 A1* | 11/2015 | Ould Dellahy, VIII | |
| | | | H04N 21/234 |
| | | | 725/32 |
| 2017/0344004 A1* | 11/2017 | Foster | G05D 1/0088 |

* cited by examiner

VISUALIZATION OF NAVIGATION INFORMATION FOR CONNECTED AUTONOMOUS VEHICLES

TECHNICAL FIELD

The subject matter of this invention relates generally to automated automobile navigation. More specifically, aspects of the present invention provide a solution for improved processing and display of navigation information for connected autonomous vehicles.

BACKGROUND

In the information technology environment of today, the collection and analysis of data is becoming increasingly important. As more and more devices and processes become fully or partially automated, the timeliness and accuracy of the information that is relied on to determine the actions of these devices and processes becomes more critical. One area in which this may apply is in the autonomous vehicle environment. In an autonomous vehicle environment the participating autonomous vehicles gather information from the world around them and either process the information or forward the information for processing. Based on this processing, the actions that the autonomous vehicle should carry out can be determined for the particular circumstances of the autonomous vehicle. As such, the actions that are taken by the autonomous vehicle, the decisions that underlie these actions, and/or the information used to arrive at these decisions are often unavailable, either to people within the vehicle or otherwise.

SUMMARY

In general, embodiments described herein provide approaches for visualizing navigation information for a connected autonomous vehicle. Specifically, navigation communications (e.g., communications that are used in the decision making process of autonomous vehicles) from a plurality of vehicles within a particular area are received by a server. The server analyzes all of the navigation communications to determine which of the navigation communications is relevant to a particular connected autonomous vehicle. These relevant navigation communications are used by the server to generate contextual information about the other vehicles in the area. This contextual information is applied to a video display of the area.

One aspect of the present invention includes a computer-implemented method for visualizing navigation information for a connected autonomous vehicle, the method comprising: obtaining, by a server, navigation communications from a plurality of vehicles within an area; determining which of the navigation communications is relevant to the connected autonomous vehicle; generating contextual information about the plurality of vehicles based on the relevant navigation communications; and applying the contextual information to a video display of the area.

Another aspect of the present invention includes a computer system for visualizing navigation information for a connected autonomous vehicle, the computer system comprising: a memory medium comprising program instructions; a bus coupled to the memory medium; and a processor for executing the program instructions, the instructions causing the system to: obtain, by a server, navigation communications from a plurality of vehicles within an area; determine which of the navigation communications is relevant to the connected autonomous vehicle; generate contextual information about the plurality of vehicles based on the relevant navigation communications; and apply the contextual information to a video display of the area.

Yet another aspect of the present invention includes a computer program product for visualizing navigation information for a connected autonomous vehicle, the computer program product comprising a computer readable storage device, and program instructions stored on the computer readable storage device, to: obtain navigation communications from a plurality of vehicles within an area; determine which of the navigation communications is relevant to the connected autonomous vehicle; generate contextual information for the plurality of vehicles based on the relevant navigation communications; and apply the contextual information to a video display of the area.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide approaches for visualizing navigation information for a connected autonomous vehicle. Specifically, navigation communications (e.g., communications that are used in the decision making process of autonomous vehicles) from a plurality of vehicles within a particular area are received by a server. The server analyzes all of the navigation communications to determine which of the navigation communications is relevant to a particular connected autonomous vehicle. These relevant navigation communications are used by the server to generate contextual information about the other vehicles in the area. This contextual information is applied to a video display of the area.

Figure 1:
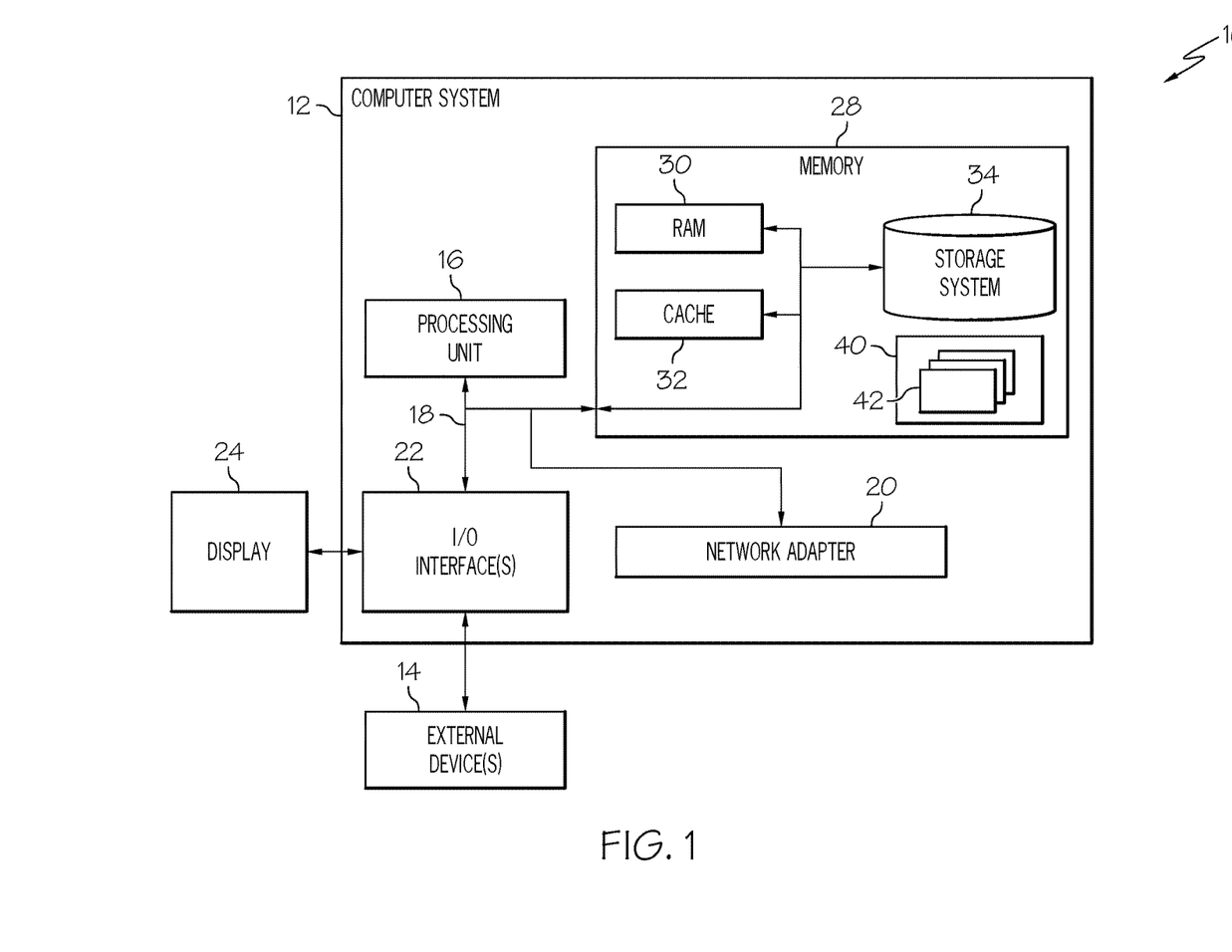
FIG. 1 shows a block diagram that illustrates a computer implementation in which the invention may be implemented according to illustrative embodiments.

Referring now to FIG. 1, a computerized implementation 10 of an embodiment for visualizing navigation information for a connected autonomous vehicle is shown. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system for visualizing navigation information for a connected autonomous vehicle. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as for visualizing navigation information for a connected autonomous vehicle, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

Figure 2:
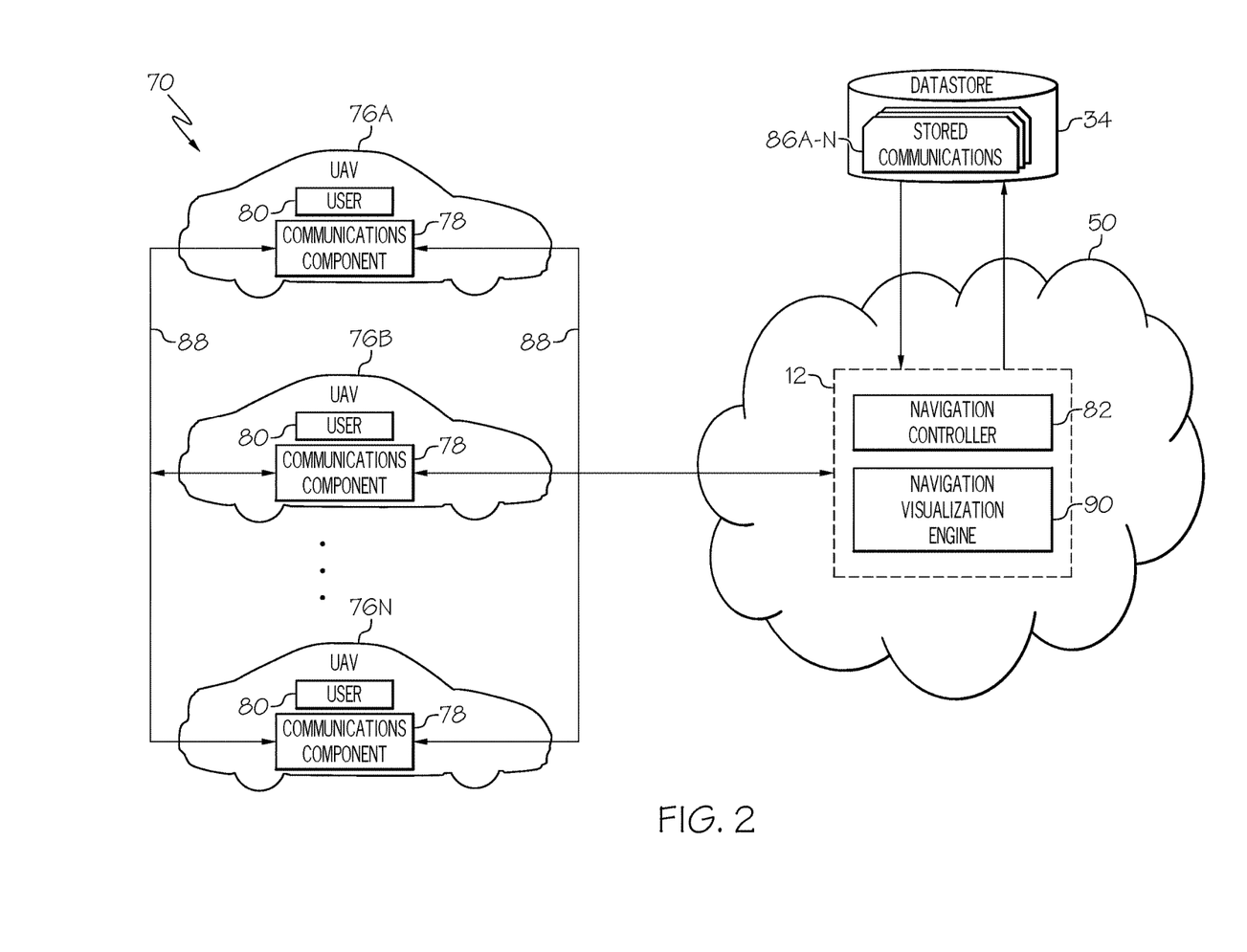
FIG. 2 shows an example system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each client need not have a navigation visualization engine (hereinafter "system 90"). Rather, system 90 could be loaded on a server or server-capable device that communicates (e.g., wirelessly) with the clients to provide navigation visualization therefor. Regardless, as depicted, system 90 is shown within computer system/server 12. In general, system 90 can be implemented as program/utility 40 on computer system 12 of FIG. 1 and can enable the functions recited herein. It is further understood that system 90 may be incorporated within or work in conjunction with any type of system that receives, processes, and/or executes commands with respect to IT resources in a networked computing environment. Such other system(s) have not been shown in FIG. 2 for brevity purposes.

Figure 3:
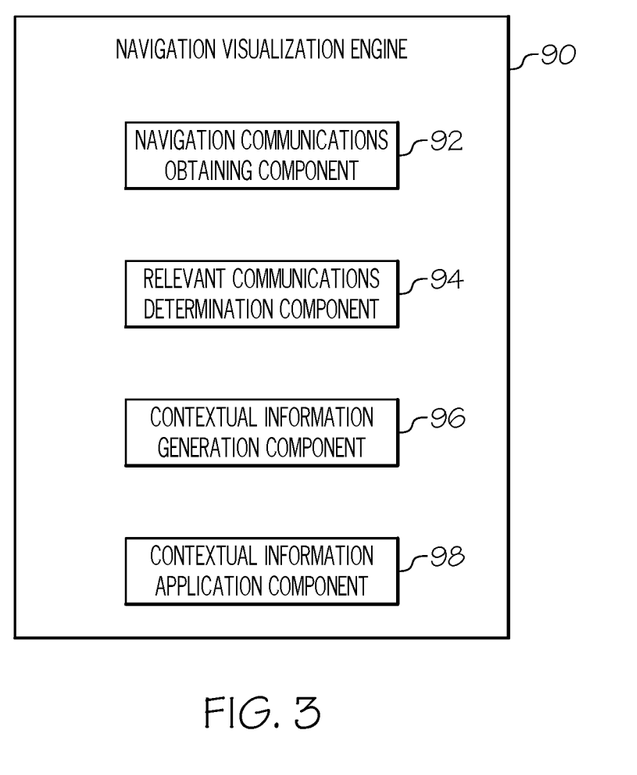
FIG. 3 shows a block diagram that illustrates a system according to illustrative embodiments.

Referring now to FIG. 3, system 90 may perform multiple functions similar to a general-purpose computer. Specifically, among other functions, system 90 can function to visualize navigation information for a connected autonomous vehicle in networked computing environment 70. To accomplish this, system 90 can include: a navigation communications obtaining component 92, a relevant communications determination component 94, a contextual information generation component 96, and a contextual information application component 98.

Referring again to FIGS. 2 and 3, navigation communications obtaining component 92 of system 90, as executed by computer system/server 12 is configured to obtain navigation communications 88 from a plurality of vehicles (e.g., UAVs 76A-N) within an area. The navigation communications 88 that are obtained by navigation communications obtaining component 92 may include communications between the vehicles 76A-N and a navigation control server. This navigation control server controls the movement of UAVs 76A-N for which it is responsible. To this extent, the navigation control server has a navigation controller 82, which can be a remote cloud-based traffic application that can collect data from a communications component 78 located on each of the plurality of vehicles (e.g., UAVs 76A-N). Navigation controller 82 can use these navigation communications 88 to formulate instructions for one or more of the vehicles (e.g., UAV 76A), which can be sent to the one or more vehicles (e.g., UAV 76 A) in the form of navigation communications 88.

To facilitate the collection of this data, each of UAVs 76A-N can have a set of sensors that gather all the data necessary for the operating of the UAV. This data could include data regarding the absolute position of the vehicle, the position of the vehicle with respect to other vehicles, velocity of the vehicle, acceleration of the vehicle, mechanical condition of the vehicle, environmental conditions, and/or any other necessary information. To facilitate the collection of this data, the sensors can include light-based (e.g., laser), sound-based (e.g., sonar), heat-based (e.g., infrared), video devices, audio devices, motion detectors, mechanical sensors, vehicle component sensors, thermometers, accelerometers, and/or any other solution now known or later developed.

In any event, as stated above, each of UAVs has a communications component 78 that communicates this data to navigation controller 82 in the form of navigation communications 88. The communications component 78 corresponding to each vehicle (e.g., UAV 76A) can also share navigation communications 88 with other vehicles (UAV 76B-N). Further, vehicles that are non-autonomous can also have a communications component 78 installed thereon for communicating data (e.g., from sensors on the non-autonomous vehicle) in the form of navigation communications 88 to UAVs 76A-N and/or to navigation controller. These shared navigation communications 88 can be forwarded to navigation controller 82 to aid in the formulation of instructions for navigating the vehicle. To this extent, communications component 78 can include any solution for sending and/or receiving communications now known or later developed including, but not limited to: satellite, wireless, WiFi, Bluetooth, radio, microwave, and/or the like.

Figure 4:
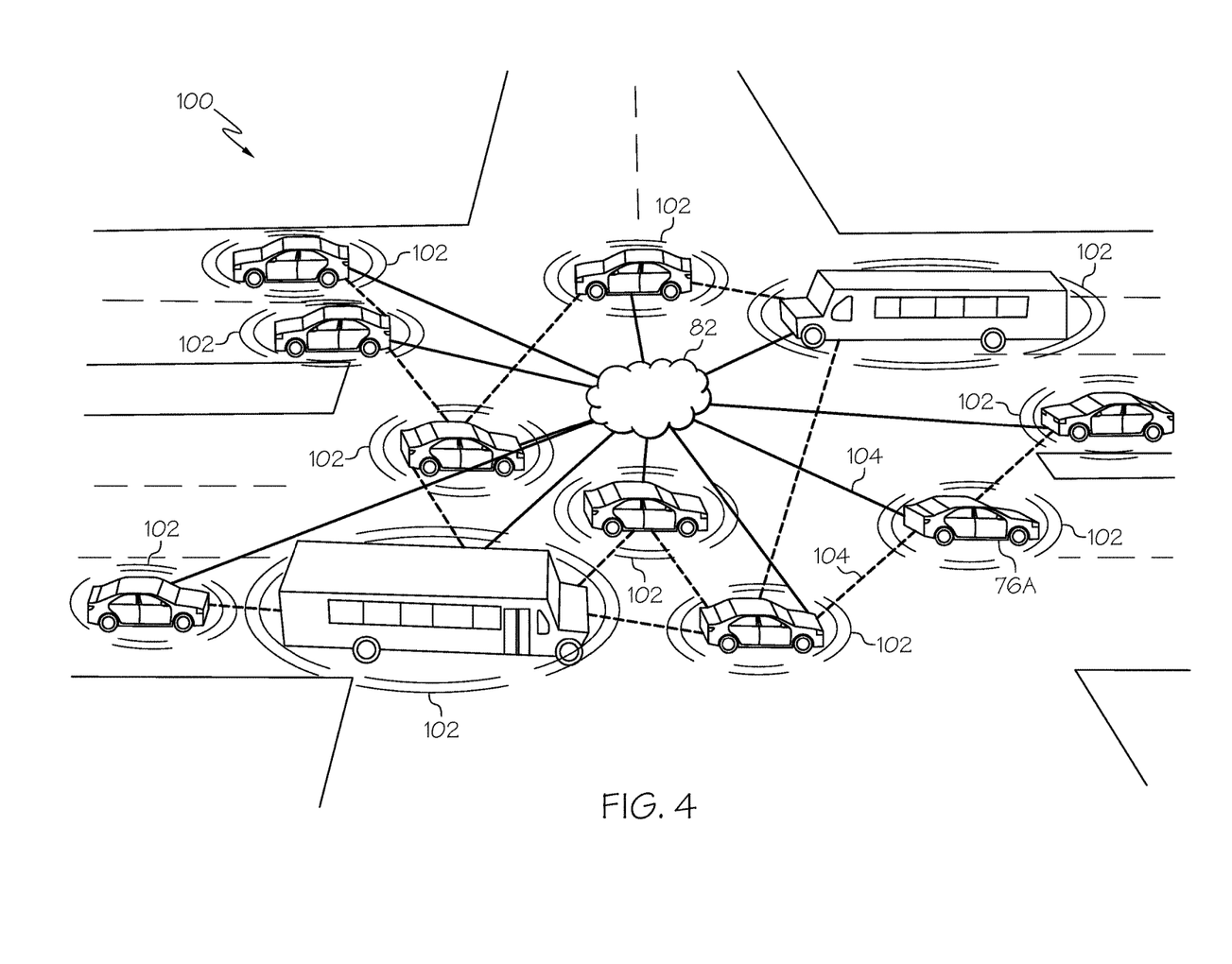
FIG. 4 shows an example area according to illustrative embodiments.

Referring now to FIG. 4, an example area 100 is illustrated according to embodiments of the invention. Area 100 can include and/or be part of an intersection, a street segment, a city block, a neighborhood, a highway segment, a town, a city, and/or any other place upon which a UAV may be operated. In any case, as shown, included within area 100 is a plurality of vehicles (e.g., UAV 76A). Each of the plurality of vehicles 76A is shown as sensing 102 data about its surroundings and communicating 104 navigation communications 88 with navigation controller 82 and the vehicles that are located within area 100.

The inventors of the invention described herein have discovered certain deficiencies in the utilization of UAVs 76A-N in an area 100. For example, because the UAVs 76A-N perform their actions autonomously, the users/passengers 80 in the vehicles may not be able to anticipate what actions their own UAV or other UAVs will be performing. Further, because the data underlying these actions is not visible to the users/passengers 80, these users/passengers 80 may be confused as to why the UAV is performing a particular action. This can cause feelings of anxiety or discomfort on the part of the user/passenger 80 or cause the user/passenger 80 to incorrectly believe that the UAV is malfunctioning. Further, the lack of available data to the user/passenger 80 can cause the user/passenger 80 to be unaware when his or her UAV or another proximate UAV is malfunctioning or when a vehicle may be being operated in a manner that is unsafe. Further, in the event that the actions of UAVs in a given situation (e.g., in response to an accident) need to be reviewed, there is currently no way to present the raw data in a way that is easily interpreted.

Navigation communications obtaining component 92 can obtain navigation communications 88, which can include the communications from the vehicle (e.g., UAV 76A) to navigation controller 82, communications from navigation controller 82 to the vehicle, and/or shared communications between the vehicle and other vehicles (e.g., UAV 76B-N). In any case, navigation communications obtaining component 92 can obtain navigation communications 88 utilizing one or more solutions. In an embodiment, these navigation communications 88 can be obtained in real time as they are being sent and received. For example, as each vehicle sends or receives navigation communications 88 the vehicle can send a copy of the navigation communications 88 to navigation communications obtaining component 92. Alternatively, the copies can be created by the navigation controller 82 or an intermediary (e.g., a router) between the vehicle and navigation controller 82. Additionally, or in the alternative, the navigation communications 88 can be sent to a datastore 34 and stored in the form of stored communications 86A-N. These stored communications can be obtained later by navigation communications obtaining component 92 (e.g., upon request).

Referring again to FIGS. 1-3, relevant communications determination component 94 of system 90, as executed by computer system/server 12, is configured to determine which of the navigation communications 88 is relevant to the connected autonomous vehicle (e.g., UAV 76A). In particular, it should be understood that the navigation communications 88 obtained by navigation communications obtaining component 92 include a stream of real-time data that exceeds the capacity of a user 80 to comprehend. To this extent, in order to present the information to the user 80 in a meaningful way, relevant communications determination component 94 inspects the navigation communications 88 and includes only those navigation communications 88 that are necessary for conveying the necessary information to the user 80.

For example, assume that user 80 is a passenger in UAV 76A. UAV 76A has a front mounted camera that has a predetermined field of view (e.g., 45 degrees). In such a case, relevant communications determination component 94 could include as relevant all navigation communications 88 that are within a set distance of the vehicle in the direction that the camera is facing and are within the field of view (or, alternatively, within a predetermined degree of angle within or outside the field of view). The distance and/or angle of navigation communications 88 considered to be relevant can be set by user 80, by an administrator, and/or automatically. For example, this could be within 50, 100 or 500 meters for any navigational communications 88. The distance set for relevant navigational communications 88 can differ depending on the type of navigational communications 88. To this extent, navigation communications 88 that are outside the set distance and/or the camera viewpoint may be included as relevant based on the type of information in the communications. For example, information regarding environmental conditions, a UAV that has ceased operating, or an automobile that is considered to have a dangerous driver may be included even if the navigation communications 88 are outside the specified range. Other factors that can impact which navigation communications 88 are considered relevant include, but are not limited to: whether the area is urban or rural, the amount of traffic in the area, the time of day, the speed of the vehicle, whether the UAV is operating on highway or residential streets, and/or the like.

Contextual information generation component 96 of system 90, as executed by computer system/server 12, is configured to generate contextual information about the vehicles around the UAV based on the relevant navigation communications. To this extent, contextual information generation component 96 extracts information from the navigation communications 88 for including in a graphical visualization. For example, because the communications component 78 of each vehicle has a unique identifier, contextual information generation component 96 can cross reference the identifier for a particular vehicle to obtain information regarding whether the vehicle is autonomous or not. Further, this information can be compared with sensor information to determine whether a vehicle that is in proximity to the vehicle is communicating with other vehicles. If such a vehicle were operating in a zone in which only automated vehicles are allowed, this vehicle could be tagged as dangerous, and an alert could be generated by system 90. Still further, the information obtained from the unique identifier could be used to score each vehicle that is in proximity to the UAV based on risk. For example, contextual information generation component 96 can use the identity of each vehicle to perform a real-time check of the vehicle with the police department, department of motor vehicles (DMV)

and/or the like, to determine whether the vehicle has had citations or accidents. Other avenues such as social media can also be checked for this information. Each vehicle can then be scored based on such information as the severity of accident/citation, the type thereof, the frequency and/or the social media incident reporting. Contextual information generation component 96 can then group the vehicles into risk categories (e.g., high, medium, low) based on the scoring.

In addition, contextual information generation component 96 can also generate contextual information about the current operations of the surrounding vehicles based on navigational communications 88 that have been deemed relevant. For example, navigational communications 88 from other vehicles that indicate that the distance between the other vehicle and the vehicle in front of the other vehicle is decreasing can indicate that traffic ahead is slowing. Further, navigational communications 88 that include instructions from navigation controller 82 can be used to gain information that a particular vehicle will be slowing, stopping, changing lanes, turning, and/or the like.

Contextual information application component 98 of system 90, as executed by computer system/server 12, is configured to apply the contextual information to a video display of the area. The video display that is augmented with the contextual information can be a display from a camera that is onboard the UAV so that a user 80 who is a passenger in the vehicle can see what is happening in real time. Alternatively, a user 80 (e.g., who is a public official, insurance company representative, traffic control planner, etc.) can view an augmented video display from a traffic camera or any other location. Whatever the case, user 80 can define the location (e.g., in a browser, app, etc.) as either relative to current environment (e.g., passenger in autonomous vehicle) or with respect to a defined location. User 80 can also define a time period, which can be real time or based on a defined date and time period for which a visualization of the communication between vehicles is desired. Then, user 80 can visualize the connection information between vehicles based on the given coordinates on a mobile device, smart TV, augmented reality glasses, etc.

In any case, contextual information application component 98 can overlay the contextual information onto the video content. Based on the video camera and direction and distance measurement, system 90 can identify relative positions of a particular vehicle, and the contextual information can be overlaid over the vehicle in the video content. For example, if communications component 78 of a UAV is not connected, then the contextual information will be used to highlight the UAV that is not connected. In a UAV-only environment, a disconnected autonomous vehicle can be identified as a vehicle which has been hacked or a problematic vehicle, and an alert can be sent (e.g., to disable the vehicle or to inform the authorities to intercept the vehicle). Additionally, the contextual information can be used to show connections between vehicles through connected lines with various indicators, such as: by thickness of line, line type (solid, dashed), color, highlight of vehicle type, haptic feedback on line, and/or the like. For example, in an embodiment, the vehicle type can be displayed by outlining autonomous vehicles with a green line, non-autonomous vehicles that have a communications component 78 with a black line, and non-autonomous (no vehicle communication) with a red line. In a further example, the contextual information can indicate driving information (right turn, brakes, etc.) as a thin line, which could be color coded to function and/or road conditions: (ice ahead, hazard, etc.) as a thick line. In yet another example, contextual information can display the risk category calculated for each vehicle as a tint over the vehicle on the display (i.e., RED=high risk, YELLOW=medium risk, GREEN=low risk). In addition, explanatory text (indicating speed of the other vehicle, road conditional) could be associated with the contextual information. This text can be displayed by default and/or can be displayed upon interaction by the user 80 with the contextual information.

Figure 5:
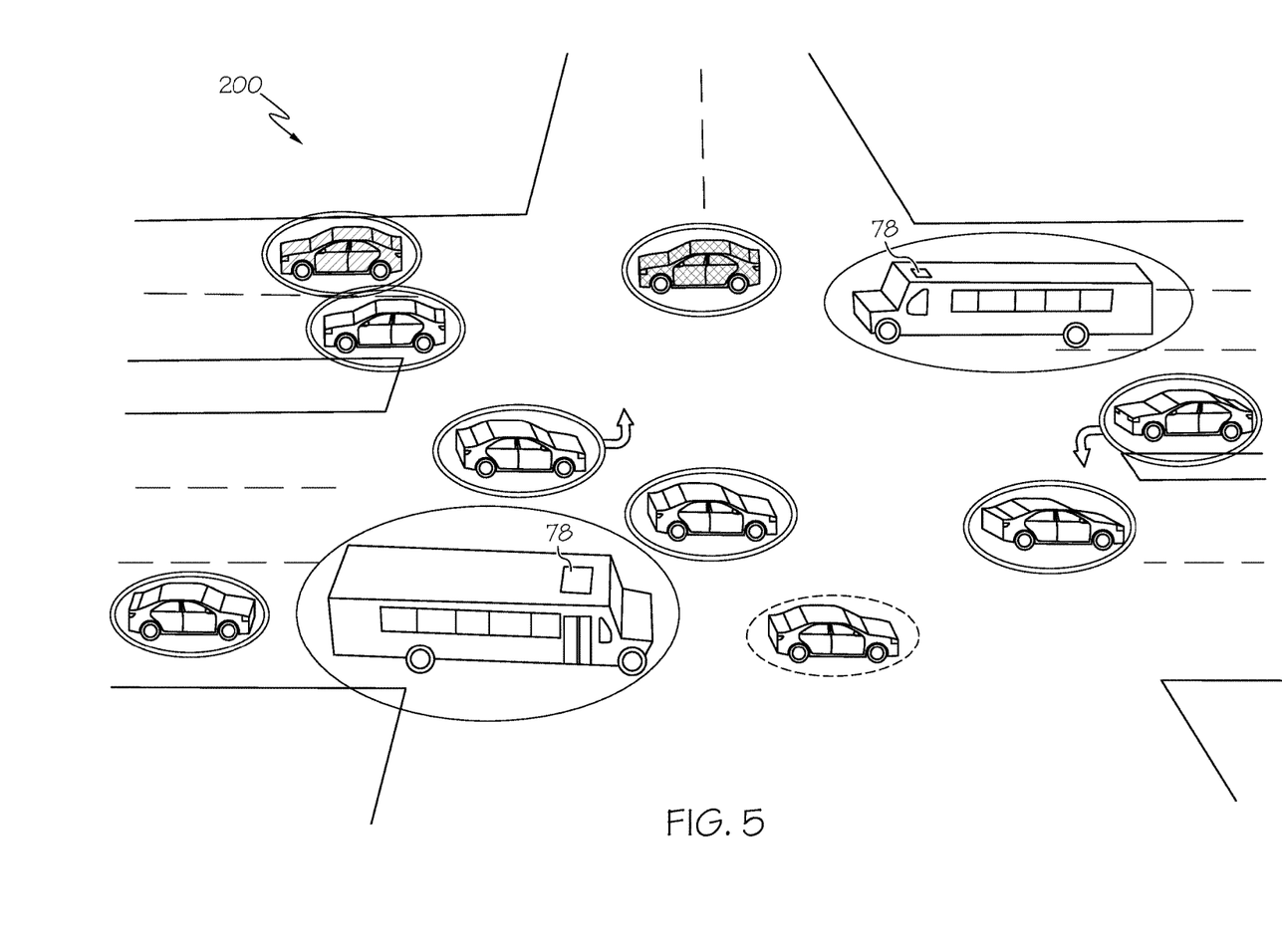
FIG. 5 shows an example visualization with overlaid contextual information according to illustrative embodiments.

Referring now to FIG. 5, a visualization 200 with contextual information according to an embodiment of the present invention is shown. As can be seen, the visualization 200 of FIG. 5 is of the area 100 shown in FIG. 4. Further, various contextual information has been overlaid onto the video. As can be seen, the car directly in front of the closest bus has contextual information in the form of a dashed line surrounding it, indicating that it does not have a communications component 78. Both buses have contextual information in the form of a single line surrounding them, indicating that they have communications components 78 but are not autonomous vehicles. All other vehicles have double lines surrounding them, indicating that they are all autonomous vehicles. Although FIG. 5 shows the contextual information in the form of ovals, it should be understood that other geometric or non-geometric representations are allowed. For example, in an embodiment, the shape of the vehicle can be determined and the contextual information shaped to form an outer border of the vehicle. In any case, Visualization 200 also shows that the vehicle in front of the furthest bus has been shaded with a double hash and the vehicle in front of that vehicle has been shaded with a single hash, indicating that they are high and medium risk vehicles, respectively. In addition, the vehicles that are turning have been indicated with arrows. It is to be understood that the above described methods of displaying contextual information are not intended to be limiting and that contextual information can be displayed by any indicators now known or later discovered.

Figure 6:
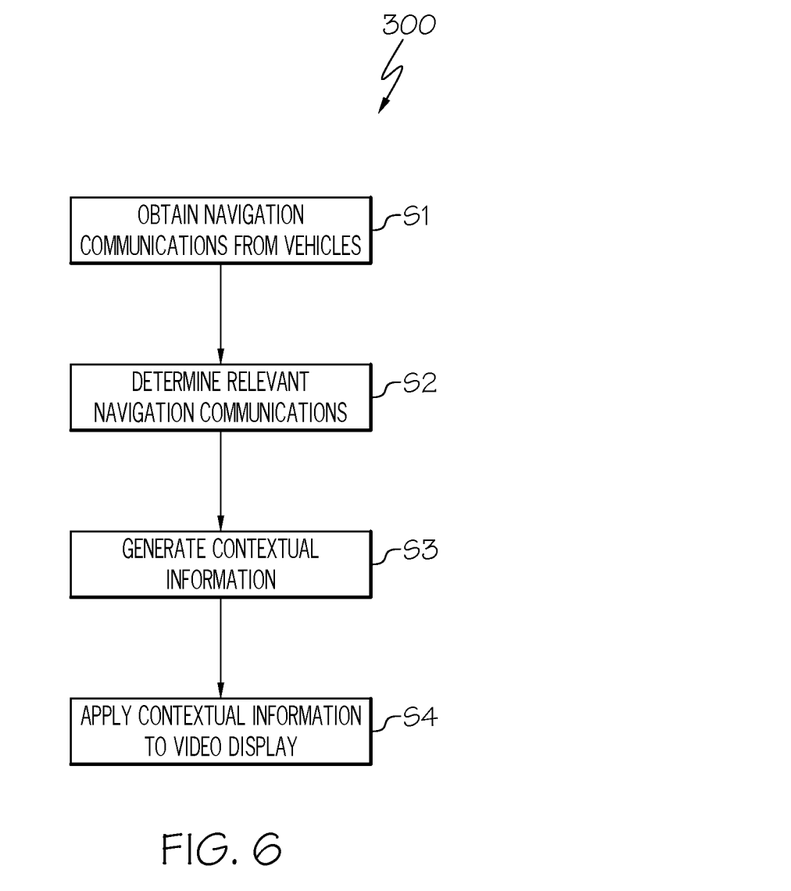
FIG. 6 shows a process flow diagram according to illustrative embodiments.

Referring now to FIG. 6 in conjunction with FIGS. 1-3, a method flow diagram 300 according to an embodiment of the present invention is shown. At S1, navigation communications obtaining component 92 of system 90, as executed by computer system/server 12, obtains navigation communications from a plurality of vehicles in an area. At S2, relevant communications determination component 94 determines which navigation communications are relevant. At S3, contextual information generation component 96 generates contextual information from the relevant navigation communications. At S4, contextual information application component 98 applies the contextual information to a video display.

Process flowchart 300 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for visualizing navigation information for a connected autonomous vehicle. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for visualizing navigation information for a connected autonomous vehicle. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (i.e., the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for visualizing navigation information for a connected autonomous vehicle. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for visualizing navigation information for a connected autonomous vehicle, the method comprising:
    obtaining, by a server, navigation communications from a plurality of vehicles within an area;
    determining which of the navigation communications is relevant to the connected autonomous vehicle;
    generating contextual information about the plurality of vehicles based on the relevant navigation communications; and
    applying the contextual information to a video display of the area that contains a visual representation of each vehicle of the plurality of vehicles located within a video display of the area, the applying including applying the contextual information applicable to each vehicle of the plurality of vehicles to the visual representation of the vehicle located within the video display of the area.

2. The method of claim 1, wherein the navigation communications include communications between each of the plurality of vehicles and a navigation control server and communications between each of the plurality of vehicles and others of the plurality of vehicles.

3. The method of claim 2, wherein the navigation communications include a vehicle speed, a vehicle distance from another vehicle, a vehicle intended action, and an ability to communicate with another vehicle.

4. The method of claim 3, further comprising generating an alert with regard to another vehicle in response to an inability to communicate with the another vehicle.

5. The method of claim 1, wherein the generated contextual information includes other vehicle status information that is selected from a group comprising: whether another vehicle is an autonomous vehicle, whether another vehicle is transmitting the navigation communications, whether another vehicle is considered a dangerous vehicle, a speed change of another vehicle, and a direction change of another vehicle.

6. The method of claim 1,
    wherein the contextual information is applied in real time to the video display provided to a passenger of the connected autonomous vehicle as the connected autonomous vehicle is operating, and
    wherein the video display is provided on a video device that is selected from a group, consisting of: a display within the connected autonomous vehicle and a mobile device associated with the passenger.

7. The method of claim 1, wherein the contextual information that is applied to the video display is retrieved from storage in response to a request from a user.

8. A computer system for visualizing navigation information for a connected autonomous vehicle, the computer system comprising:
    a memory medium comprising program instructions;
    a bus coupled to the memory medium; and
    a processor for executing the program instructions, the instructions causing the system to:

obtain, by a server, navigation communications from a plurality of vehicles within an area;

determine which of the navigation communications is relevant to the connected autonomous vehicle;

generate contextual information about the plurality of vehicles based on the relevant navigation communications; and apply the contextual information to a video display of the area that contains a visual representation of each vehicle of the plurality of vehicles located within a video display of the area, the applying including applying overlaying the contextual information applicable to each vehicle of the plurality of vehicles to the visual representation of the vehicle located within the video display of the area.

9. The computer system of claim 8, wherein the navigation communications include communications between each of the plurality of vehicles and a navigation control server and communications between each of the plurality of vehicles and others of the plurality of vehicles.

10. The computer system of claim 9, wherein the navigation communications include a vehicle speed, a vehicle distance from another vehicle, a vehicle intended action, and an ability to communicate with another vehicle.

11. The computer system of claim 10, further comprising generating an alert with regard to another vehicle in response to an inability to communicate with the another vehicle.

12. The computer system of claim 8, wherein the generated contextual information includes other vehicle status information that is selected from a group comprising: whether another vehicle is an autonomous vehicle, whether another vehicle is transmitting the navigation communications, whether another vehicle is considered a dangerous vehicle, a speed change of another vehicle, and a direction change of another vehicle.

13. The computer system of claim 8,
wherein the contextual information is applied in real time to the video display provided to a passenger of the connected autonomous vehicle as the connected autonomous vehicle is operating, and
wherein the video display is provided on a video device that is selected from a group, consisting of: a display within the connected autonomous vehicle and a mobile device associated with the passenger.

14. The computer system of claim 8, wherein the contextual information that is applied in real time to the video display is retrieved from storage in response to a request from a user.

15. A computer program product for visualizing navigation information for a connected autonomous vehicle, the computer program product comprising a computer readable storage device, and program instructions stored on the computer readable storage device, which, when executed by a computer device, operate to:

obtain navigation communications from a plurality of vehicles within an area;

determine which of the navigation communications is relevant to the connected autonomous vehicle;

generate contextual information for the plurality of vehicles based on the relevant navigation communications; and apply the contextual information to a video display of the area that contains a visual representation of each vehicle of the plurality of vehicles located within a video display of the area, the applying including applying the contextual information applicable to each vehicle of the plurality of vehicles to the visual representation of the vehicle located within the video display of the area.

16. The computer program product of claim 15, wherein the navigation communications include communications between each of the plurality of vehicles and a navigation control server and communications between each of the plurality of vehicles and others of the plurality of vehicles and include a vehicle speed, a vehicle distance from another vehicle, a vehicle intended action, and an ability to communicate with another vehicle.

17. The computer program product of claim 16, further comprising generating an alert with regard to another vehicle in response to an inability to communicate with the another vehicle.

18. The computer program product of claim 15, wherein the generated contextual information includes other vehicle status information that is selected from a group comprising: whether another vehicle is an autonomous vehicle, whether another vehicle is transmitting the navigation communications, whether another vehicle is considered a dangerous vehicle, a speed change of another vehicle, and a direction change of another vehicle.

19. The computer program product of claim 15,
wherein the contextual information is applied in real time to the video display provided to a passenger of the connected autonomous vehicle as the connected autonomous vehicle is operating, and
wherein the video display is provided on a video device that is selected from a group, consisting of: a display within the connected autonomous vehicle and a mobile device associated with the passenger.

20. The computer program product of claim 15, wherein the contextual information that is applied to the video display is retrieved from storage in response to a request from a user.

* * * * *